United States Patent [19]

Allen et al.

[11] Patent Number: 4,564,164

[45] Date of Patent: Jan. 14, 1986

[54] ADJUSTABLE SUPPORT SYSTEM

[76] Inventors: R. Daniel Allen, 14429 Bass Lake Rd., P.O. Box 189, Newbury, Ohio 44065; Howard F. Fink, 2313 19th Ave. West, Bradenton, Fla. 33505

[21] Appl. No.: 618,817

[22] Filed: Jun. 8, 1984

[51] Int. Cl.⁴ .............................................. B68G 5/00
[52] U.S. Cl. .................................... 248/118; 269/322
[58] Field of Search .................. 248/118, 118.3, 118.5, 248/121, 229 A, DIG. 13; 403/63, 188; 269/322, 328, 323

[56] References Cited

U.S. PATENT DOCUMENTS

| | | | | |
|---|---|---|---|---|
| 2,618,451 | 11/1952 | Campo | ................................ | 248/122 |
| 3,298,074 | 1/1967 | Kedem | ................................ | 403/188 |
| 4,432,525 | 2/1984 | Duval | ................................. | 248/287 |

FOREIGN PATENT DOCUMENTS

| | | | | |
|---|---|---|---|---|
| 0335555 | 4/1921 | Fed. Rep. of Germany | ...... | 403/188 |
| 1090685 | 4/1955 | France | ................................ | 269/322 |
| 0112238 | 1/1918 | United Kingdom | ................ | 248/118 |

Primary Examiner—Ramon S. Britts
Assistant Examiner—Ramon O. Ramirez
Attorney, Agent, or Firm—Raymond H. Quist

[57] ABSTRACT

Two metal blocks, each having a cylindrical passage containing a rod, and a slot extending from one side to the cylindrical passage, also have a hole extending across the slots. A threaded member passes through the hole in one block and into threads contained in the other block beyond the slot. A compression head is mounted on the other end of the threaded member and is provided with a handle. When the handle is turned to advance the threaded member, the slots tend to close somewhat preventing movement of the rods in the blocks. When the threaded member is withdrawn slightly, the rods can be moved to desired positions relative to the blocks and the blocks can be rotated relative to each other.

7 Claims, 4 Drawing Figures

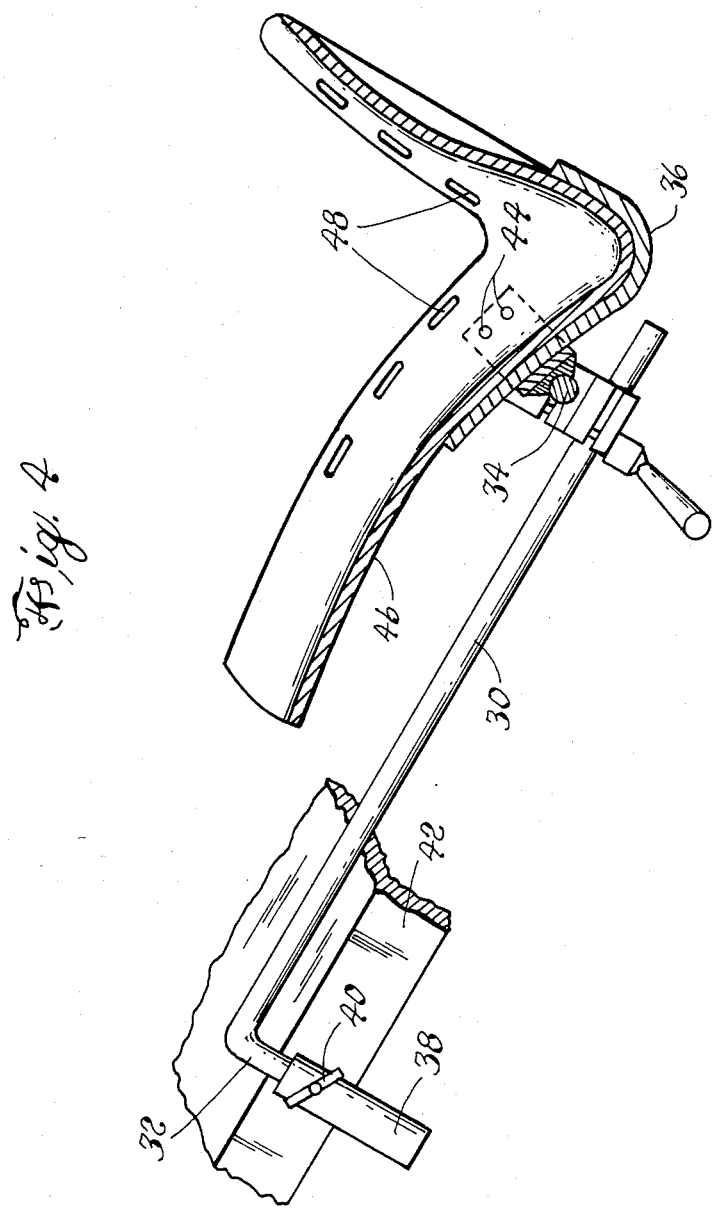

4,564,164

ADJUSTABLE SUPPORT SYSTEM

BACKGROUND OF THE INVENTION

This invention relates generally to an adjustable support system having three degrees of freedom, and more particularly to a system in which one handle will lock the system in a desired position.

There are a number of applications where adjustable supports are used. The tripod is one common example. Supports for jigs or parts in factory production frequently have some degree of adjustability. These examples typically require separate locking of separate adjusting devices. The need which first attracted the attention of the present inventors was that of positioning and holding in place the limb of a person for surgery. This particular need requires apparatus which can be sterilized and is readily adjusted. It became apparent that the support system developed for this purpose was also suitable for additional applications.

SUMMARY OF THE INVENTION

First and second blocks are each provided with a cylindrical passage for holding rods. Each block has a slot which extends from one edge to the cylindrical passage. The first block has a hole at right angles to the cylindrical passage which begins on one side and extends beyond the slot. This hole is tapped at least in the portion beyond the slot and may be provided with a Helicoil. The second block also has a hole at right angles to the cylindrical passage; however, this hole passes completely through the block crossing the slot. This hole is not tapped. A compression head having a threaded member is provided to lock the system when desired. The threaded member is passed through the hole in the second block and into the hole in the first block. When the compression head is not tightened, the blocks can move along their respective rods and be rotated about them. The blocks can also be rotated relative to each other. When the compression head is tightened, the slots on the blocks close slightly locking the rods in place in the blocks and the blocks are also held against movement relative to each other. Support means not part of this invention typically will hold one end of one rod, while one end of the other rod has mounted on it any desired device such as a clamp, tool, part, etc. A handle or the like is used to rotate the compression head to tighten and loosen it.

DESCRIPTION OF THE DRAWINGS

FIG. 4 represents the support system of this invention used as a leg support.

DESCRIPTION OF THE PREFERRED EMBODIMENT

Figure 1:
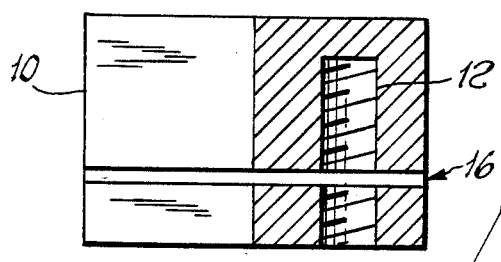
FIG. 1 is a front elevation, partly sectioned, of a block used in the invention.
Figure 2:
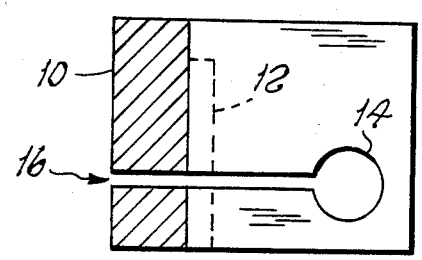
FIG. 2 is a side elevation of the block of FIG. 1.

Referring to FIG. 1, block 10 is shown in elevation with a section cut away to illustrate drilled and tapped hole 12. As FIG. 2 illustrates, block 10 has a circular passage 14 which extends completely through it. Block 10 also has slot 16 which extends from the edge of the block to passage 14. The purpose of passage 14 is to receive a cylindrical rod, and the purpose of slot 16 is to provide a means for compressing block 10 about said rod. Helicoil 18 is positioned in block 10 in tapped hole 12 beyond slot 16 and acts as the grooves for screw means to be described later. Helicoil 18 was used in the embodiment constructed because block 10 was aluminum; however, if a harder metal were used for block 10, a Helicoil would not be necessary. Without Helicoil 18, the portion of hole 12 before the slot would be drilled to remove the threads.

Figure 3:
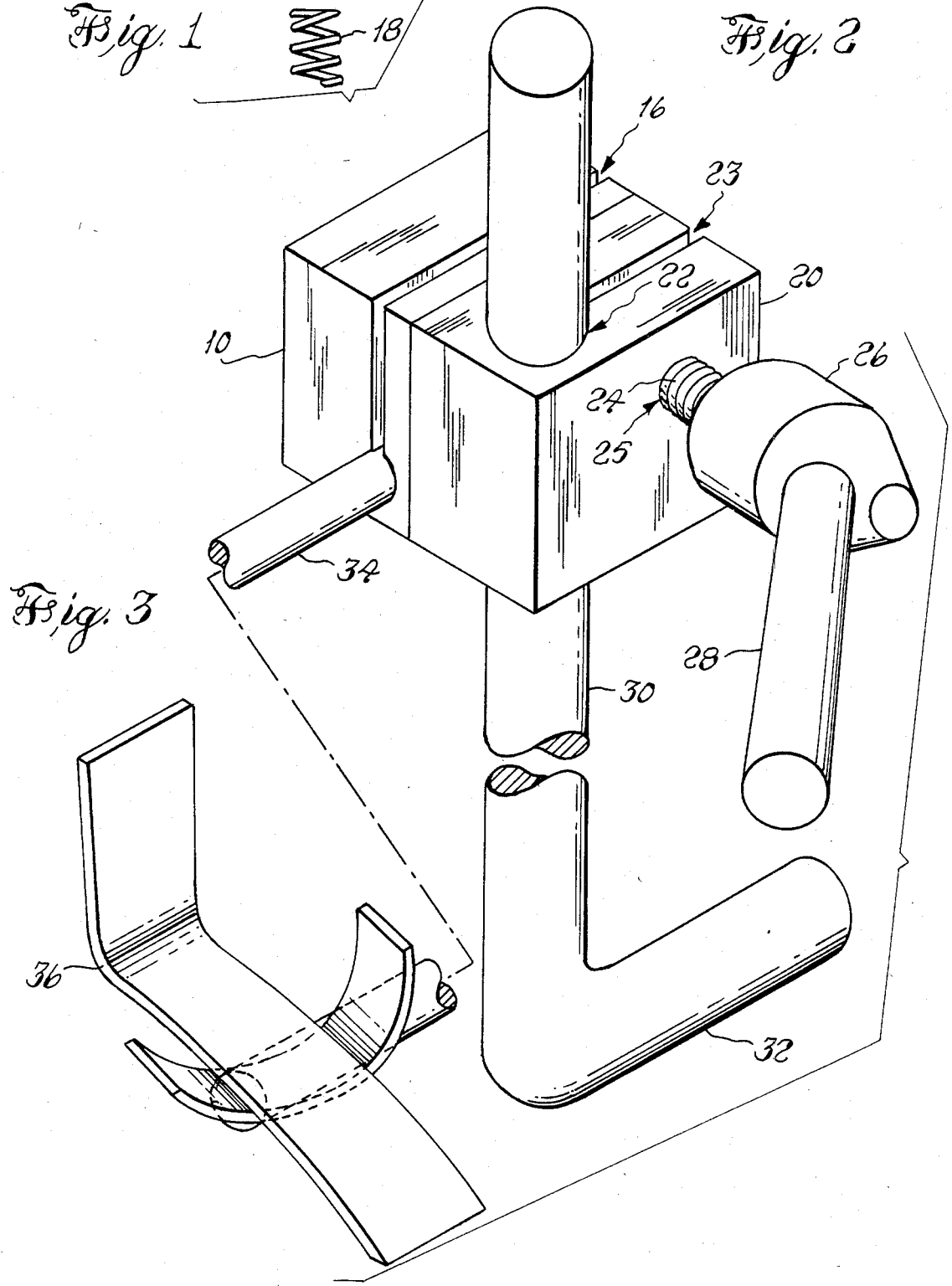
FIG. 3 is an isometric assembly drawing of the adjustable support system.

Turning now to FIG. 3, block 10 is shown with block 20 which also has a circular passage 22 and a slot 23 which extends to circular passage 22 from one side of block 20. Hole 25 is drilled through block 20, but is not tapped. Both blocks 10 and 20 are adapted to be held together by screw means 24 which is provided with compression head 26. Compression head 26 is moved in and out by turning handle 28. Block 20 is shown as containing cylindrical rod 30 which has an optional right angle bend 32. Right angle bend 32 permits mounting the support apparatus of this invention in a circular receiver of any desired type.

Block 10 is shown in FIG. 3 containing cylindrical rod 34. Bracket 36 is secured to rod 34 by welding or the like. Bracket 36 is shown by way of example of one type of device which may be adjustably supported in the apparatus.

It will be observed, that with compression head 26 slightly loosened, rod 34 can be freely rotated and moved in or out in passage 14. Also, rod 30 can be freely rotated and positioned in block 20 at any desired location. Moreover, blocks 10 and 20 can be rotated relative to each other. Actually, with right angle bend 32 mounted in some type of support, all the foregoing manipulations are accomplished by merely moving bracket 36 to a desired position. Then handle 28 is turned to lock the apparatus.

Referring now to FIG. 4, the adjustable support system of this invention is represented in a limb support application. Rod 30 has its right angle portion 32 removably secured in socket 38 at a desired height and rotational position by clamp 40. Socket 38 typically is a fitting on the side of operating table 42. Bracket 36, as described with respect to FIG. 3, is secured to rod 34 as by welding, etc. Mounted on bracket 36, for example by rivets 44, is limb support 46, which in this example is a leg support. Limb support 46 may be fabricated of metal, plastic or the like. As shown, limb support 46 has a plurality of slots 48 which may be used with straps to prevent movement of the limb secured therein. Not shown, in FIG. 4 is padding which would conventionally be provided either in limb support 46 or on the limb being supported.

It will be evident that in lieu of limb support 46 and the particular illustrated configuration of bracket 36, another device or support could be mounted on rod 34 with, as needed, a differently configured bracket 36. It will also be evident that although rod 30 is shown in FIG. 3 as having a larger diameter than rod 34, the opposite arrangement may also be suitable for a particular use.

In the embodiment constructed, metal parts were cadmium or nickel plated with the exception of the aluminum blocks and the limb support, which while metal, was painted.

Although a particular embodiment of an adjustable support system has been illustrated and described, it will be apparent that changes and modifications can be made without departing from the spirit of the invention and the scope of the appended claims.

I claim:

1. An adjustable support system comprising:
    a first block having a cylindrical passage therethrough and a slot extending from one side of said first block to said cylindrical passage;
    said first block also having a hole drilled at right angles to said cylindrical passage and through said slot;
    the portion of said hole beyond said slot having threads therein;
    a first rod sized to be contained in the cylindrical passage of said first block;
    a second block having a cylindrical passage therethrough and a slot extending from one side of said second block to said cylindrical passage;
    said second block also having a hole drilled at right angles to said cylindrical passage and through said slot;
    the hole in said second block extending completely through said second block;
    a second rod sized to be contained in the cylindrical passage of said second block; and
    a compression head having a threaded member extending therefrom long enough to pass through the hole in said second block and through the hole in said first block to mate with the threads in said first block.

2. An adjustable support system in accordance with claim 1 further comprising:
    a bracket secured to one of said rods.

3. An adjustable support system in accordance with claim 1 wherein:
    said first rod is of smaller diameter than said second rod.

4. An adjustable support system in accordance with claim 1 wherein:
    said compression head has a handle for advancing and withdrawing said threaded member.

5. An adjustable support system in accordance with claim 2 wherein:
    said bracket has secured to it a limb support.

6. An adjustable support system in accordance with claim 3 wherein:
    said limb support is a leg support.

7. An adjustable support system comprising:
    a first aluminum block having a cylindrical passage therethrough and a slot extending from one side of said first block to said cylindrical passage;
    said first block also having a hole drilled at right angles to said cylindrical passage and through said slot;
    the portion of said hole beyond said slot having threads therein;
    a Helicoil contained in the threaded portion of said hole;
    a first rod sized to be contained in the cylindrical passage of said first block;
    a second aluminum block having a cylindrical passage therethrough and a slot extending from one side of said second block to said cylindrical passage;
    said second block also having a hole drilled at right angles to said cylindrical passage and through said slot;
    the hole in said second block extending completely through said second block;
    a second rod sized to be contained in the cylindrical passage of said second block;
    said second rod having a larger diameter than said first rod and said second rod being longer than said first rod;
    a bracket fixedly secured to one end of said first rod;
    a compression head having a threaded member extending therefrom long enough to pass through the hole in said second block and through the hole in said first block to mate with the threads in said first block; and
    a handle secured to said compression head for advancing and withdrawing said threaded member.

* * * * *

UNITED STATES PATENT AND TRADEMARK OFFICE
CERTIFICATE OF CORRECTION

PATENT NO. : B1 4,564,164

DATED : August 9, 1994

INVENTOR(S) : R. Daniel Allen et al.

It is certified that error appears in the above-identified patent and that said Letters Patent is hereby corrected as shown below:

Column 1, line 47, "the" should be --this--; and

Column 2, line 38, after "and" please insert --a--.

Signed and Sealed this

Fifteenth Day of November, 1994

Attest:

BRUCE LEHMAN

Attesting Officer

Commissioner of Patents and Trademarks

REEXAMINATION CERTIFICATE (2351st)
United States Patent [19]
Allen et al.

[11] B1 4,564,164
[45] Certificate Issued    Aug. 9, 1994

[54] ADJUSTABLE SUPPORT SYSTEM

[75] Inventors: R. Daniel Allen, Newbury, Ohio; Howard F. Fink, Bradenton, Fla.

[73] Assignee: A.S. Leasing, Inc., Cleveland, Ohio

Reexamination Request:
No. 90/003,098, Jul. 12, 1993

Reexamination Certificate for:
| | |
|---|---|
| Patent No.: | 4,564,164 |
| Issued: | Jan. 14, 1986 |
| Appl. No.: | 618,817 |
| Filed: | Jun. 8, 1984 |

[51] Int. Cl.$^5$ .................................... A61G 13/12
[52] U.S. Cl. ................................... 248/118; 5/624; 5/621; 5/658; 269/78
[58] Field of Search .............. 248/118, 118.3, 118.5, 248/121, 913; 403/63, 188; 269/77, 78; 5/624, 648

[56] References Cited

U.S. PATENT DOCUMENTS

| | | | |
|---|---|---|---|
| 2,618,451 | 11/1952 | Campo | 248/122 |
| 3,298,074 | 1/1967 | Kedem | 403/188 |
| 4,432,525 | 2/1984 | Duval | 248/287 |
| 4,526,355 | 7/1985 | Moore et al. | 5/624 |

FOREIGN PATENT DOCUMENTS

0335555   4/1921   Fed. Rep. of Germany ...... 403/188

OTHER PUBLICATIONS

"The Shop Tool Manual", published by Brown & Sharpe.
"Shampaine's OB Tables and Accessories", published by Affiliated Hospital Products Inc.
"The Hexcel External Fixation System", published by Hexcel Medical.

*Primary Examiner*—Ramon O. Ramirez

[57] ABSTRACT

Two metal blocks, each having a cylindrical passage containing a rod, and a slot extending from one side to the cylindrical passage, also have a hole extending across the slots. A threaded member passes through the hole in one block and into threads contained in the other block beyond the slot. A compression head is mounted on the other end of the threaded member and is provided with a handle. When the handle is turned to advance the threaded member, the slots tend to close somewhat preventing movement of the rods in the blocks. When the threaded member is withdrawn slightly, the rods can be moved to desired positions relative to the blocks and the blocks can be rotated relative to each other.

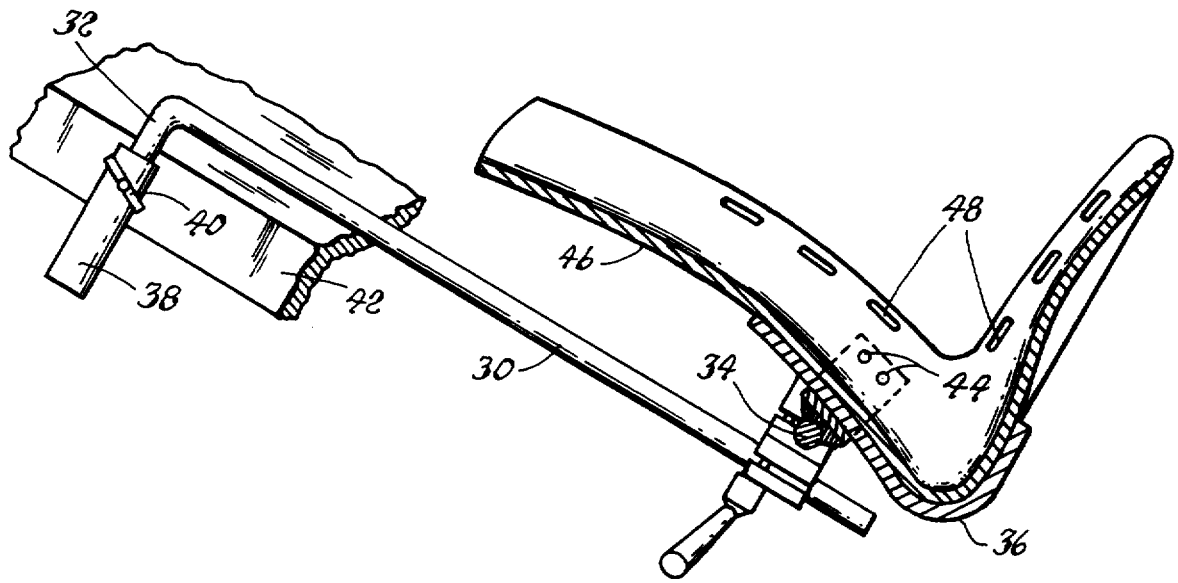

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, lines 61 through column 2, line 9:

Referring to FIG. 1, block 10 is shown in elevation with a section cut away to illustrate drilled and tapped hole 12. As FIG. 2 illustrates, block 10 has a circular passage 14 which extends completely through it. Block 10 also has slot 16 which extends from the edge of the block to passage 14. The purpose of passage 14 is to receive a cylindrical rod, and the purpose of slot 16 is to provide a means for compressing block 10 about said rod. Helicoil 18 is positioned in block 10 in tapped hole 12 beyond slot 16 and acts as the grooves for screw means to be described later. *The tapped hole should be provided with threads or an equivalent fastener, for example, the Helicoil 18, suitable for securing a member therein.* Helicoil 18 was used in the embodiment constructed because block 10 was aluminum; however, if a harder metal were used for block 10, a Helicoil would not be necessary. Without Helicoil 18, the portion of hole 12 before the slot would be drilled to remove the threads.

Column 2, lines 37-52:

Referring now to FIG. 4, the adjustable support system of this invention is represented in a limb support application. *Second rod* [Rod] 30 has its right angle portion 32 removably secured in socket 38 at a desired height and rotational position by clamp 40. Socket 38 typically is a fitting on the side of operating table 42. Bracket 36, as described with respect to FIG. 3, is secured to *first* rod 34 as by welding, etc. Mounted on bracket 36, for example by rivets 44, is limb support 46, which in the example is a *formed foot and* leg support. Limb support 46 may be *firm or rigid,* fabricated of metal, plastic or the like, *and formed to receive, for example, a foot and part of a leg therein, as shown in FIG. 4. Limb support 46 may have a foot supporting portion and a leg supporting portion which are fixed relative to each other to form a boot. As is evident from FIGS. 3 and 4, the first rod 34 is longitudinally slidable along its axis relative to the first block 10, and the second block 20 is longitudinally slidable relative to the second rod 30 along a longitudinal axis of the second rod. The first rod 34 is also rotatable or pivotable on its axis relative to the first block. The second block 20 is also rotatable or pivotable relative to the second rod 30 about the axis of the second rod 30. In addition, the blocks 10 and 20 are relatively rotatable or pivotable about an axis defined by the screw means 24 or threaded fastening member, which is perpendicular to the rod axes. Thus, the entire boot is pivotable or rotatable about three axes and may be slidable on one or two axes. The boot can be moved to any desired attitude or position relative to the table 42 by any suitable combination of the rotating and sliding movements described.* As shown, limb support 46 has a plurality of slots 48 which may be used with straps to prevent movement of the limb secured therein. Not shown, in FIG. 4 is padding which would conventionally be provided either in limb support 46 or on the limb being supported.

AS A RESULT OF REEXAMINATION, IT HAS BEEN DETERMINED THAT:

The patentability of claims 4 and 7 is confirmed.

Claims 1, 5 and 6 are determined to be patentable as amended.

Claims 2, 3 dependent on an amended claim are determined to be patentable.

New claims 8-13 are added and determined to be patentable.

1. An adjustable *formed limb* support system comprising:
   a first block having a cylindrical passage therethrough and a slot extending from one side of said first block to said cylindrical passage;
   said first block also having a hole drilled at right angles to said cylindrical passage and through said slot;
   the portion of said hole beyond said slot having threads therein;
   a first rod *having a longitudinal axis and* sized to [be] *support a limb support and rotatably* contained in the cylindrical passage of said first block *so as to permit relative rotation of the first rod and the first block on the axis of the first rod;*
   a second block having a cylindrical passage therethrough and slot extending from one side of said second block to said cylindrical passage;
   said second block also having a hole drilled at right angles to said cylindrical passage and through said slot;
   the hole in said second block extending completely through said second block;
   a second rod *having a longitudinal axis and* sized to be *attached to a table to support the limb support system and rotatably* contained in the cylindrical passage of said second block *so as to permit relative rotation of the second block on the second rod about the axis of the second rod;* [and]
   a compression head having a threaded member extending therefrom long enough to pass through the hole in said second block and through the hole in said first block to mate with the threads in said first block, *the threaded member defining an axis about which the blocks are relatively rotatable so as to permit relative rotation of said first and second blocks and said relative rotation of the rods and respective blocks when the head is loosened and locking the blocks in position when the head is tightened; and*
   *a limb support on said first rod positionable by the relative rotation of said rods and blocks on the three axes, whereby positioning of a limb in the limb support can be accomplished by movement of the limb support about the three axes when the compression head is loosened and tightening of the compression head secures the limb against such movement about the three axes.*

5. An adjustable support system in accordance with claim 2 wherein:

said bracket has secured to it [a] *the* limb support.

6. An adjustable support system in accordance with claim [3] *5* wherein:

said limb support is a leg support.

*8. An adjustable limb support system in accordance with claim 1, wherein said limb support comprises a boot formed for receiving a foot.*

*9. An adjustable limb support system in accordance with claim 8, wherein said boot comprises a leg supporting portion fixed relative to a foot supporting portion.*

*10. An adjustable limb support system in accordance with claim 9 wherein said boot comprises a unitary structure.*

*11. An adjustable limb support system in accordance with claim 8 wherein said boot is firm.*

*12. An adjustable limb support system in accordance with claim 1, wherein the second block is slidable relative to the second rod along the longitudinal axis of the second rod.*

*13. An adjustable limb support system in accordance with claim 1, wherein the first rod is slidable relative to the first block along the longitudinal axis of the first rod.*

* * * * *